United States Patent Office 3,259,962
Patented July 12, 1966

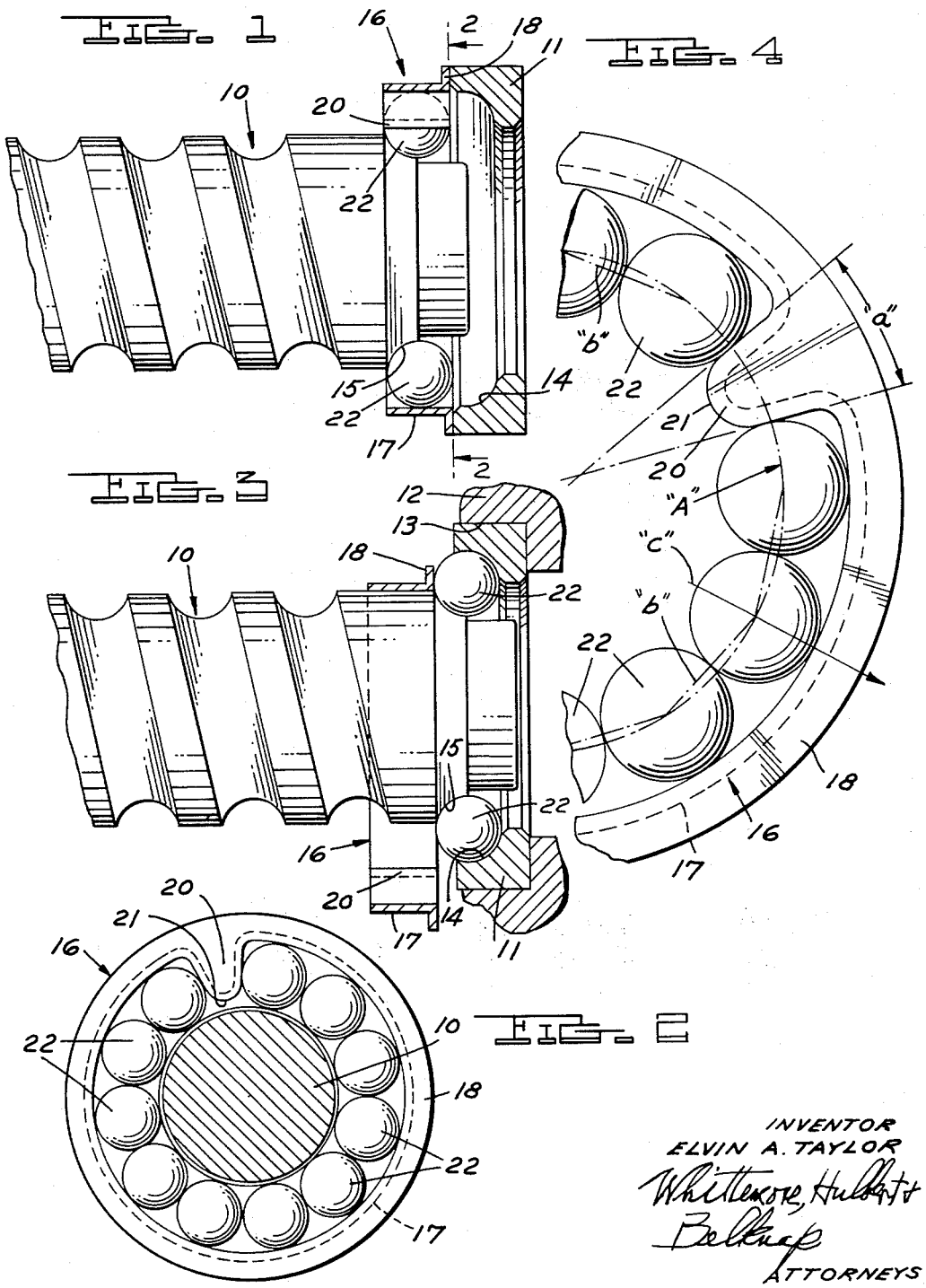

3,259,962
METHOD OF ASSEMBLING BEARING ELEMENTS
Elvin A. Taylor, Plymouth, Mich., assignor to Plymouth Stamping Company, Plymouth, Mich., a corporation of Michigan
Original application Feb. 17, 1964, Ser. No. 345,399. Divided and this application May 6, 1965, Ser. No. 453,736
5 Claims. (Cl. 29—148.4)

This application is a division of my copending application, Serial No. 345,399, filed February 17, 1964.

The present invention relates to an improved method of assembling bearing balls or equivalent rolling bearing elements between inner and outer, coaxially and radially spaced bearing members. In particular, the method deals with the assembly of a circumferential series of bearing members between race surfaces, one of which is machined or fixedly formed upon a part which is journaled by the assembled bearing structure, for example an elongated worm of a steering mechanism; such worm being in turn appropriately sustained in a relatively fixed axial relation of its integral race surface to that of a coacting, radially spaced race surface of a structure in which the end of the worm is axially received.

It is an object of the invention to provide a method calling for the use of bearing assembly means in the very simple form of an annular retainer for a series of bearing balls or equivalent roller elements. This retainer member is formed to provide an integral wedging formation extending radially inwardly of an internal circumferential retaining surface; and a substantial or major number of the series of rolling elements are arranged to extend in a circumferential array between opposite circumferential sides of said wedging formation.

In this preliminary assemblage of the bearing elements they are under circumferential compression one against the other in the array referred to, and are confined tightly by the circumferential retaining portion or surface of the annular retainer member. Because of the fact that the latter is of relatively thin character, its retaining portion is outwardly deformed to a slight extent by the wedged-in balls, sufficiently so that the confined array is prevented from unassisted radial inward movement of its component balls, or unassisted axial movement thereof out of the retainer member, pending completion of the final assembling step of the method.

In further accordance with the method of employing a structure of the above nature in the assembly of a bearing, a journaled worm or like axially extending member itself provides one of the race surfaces of the bearing, for coaction with another race surface of a structure in which the worm is journaled; and it is by opposite axial forces set up between these race surfaces in the assembly step that the series of bearing balls is displaced from the annular ball retainer or ring in an axial direction into a radial plane through the respective race surfaces, with the latter in a finally assembled and radially aligned condition.

The foregoing as well as other objects will become more apparent as this description proceeds, especially when considered in connection with the accompanying drawings illustrating the invention, wherein:

FIG. 1 is a fragmentary view in longitudinal radial section in a plane including the axis of a worm wtih which the bearing elements are to be associated, this view showing the assembly parts referred to just prior to completion of the assembly operation;

FIG. 2 is a view in transverse radial section along line 2—2 of FIG. 1, illustrating the retainer as preliminarily loaded with bearing balls pursuant to the first step of the method;

FIG. 3 is a view similar to FIG. 1, but showing the worm and coacting bearing means as finally assembled under the method; and FIG. 4 is a fragmentary diagrammatic view showing the geometry of forces arising in rendering the ball and ring pre-assembly self-sustaining prior to the final assembling step.

The reference numeral 10 in the figures designates a conventional steel worm which is to be journaled by ball bearing means including an outer race cup 11 within a fixed structure, such a gear box or casing 12, shown in FIG. 3 as being provided with a cylindrical recess or counterbore 13 in which the race member may be fixedly or relatively rotatively received.

Race member or cup 11 is a standard type, in the form of a machined steel part, adapted to exert a full radial and semi-thrust axial action at its inner circumferential race surface 14 (FIG. 1); and a coacting race surface 15 is formed on worm 10 adjacent an axial end of the latter.

Referring to FIGS. 1 and 2, the ball retainer of the invention, generally designated 16, is formed as a relatively thin-walled stamping of cold rolled steel, having a wall thickness of, say, 0.018 inch. It is provided, about the major portion of its periphery, with an axially extending ball retainer surface 17 of cylindrical outline, this surface extending axially from the inner circumference of a radially outwardly extending abutment flange 18 which, in the use of the assembly, engages axially against the race cup 11 to limit movement of retainer 16 in that direction. The inner diameter of the axially extending retainer surface 17 is shown in FIG. 2 as approximating the maximum inner diameter of the race surface 14 of race cup 11.

Finally, the retainer member or ring 16 is formed to provide an integral wedging formation or extension 20 which projects radially inwardly from the retaining surface 17, the wedging formation having a rounded inner nose 21. The circumferential width of the wedging element or formation 20 is closed interrelated to the number and diameter of a circumferential series of bearing balls 22 (shown as eleven in number), as will appear.

Thus, in using the retainer 16 in accordance with the method of the invention, the retainer is placed on a flat surface with its flange 18 up and paralleling that surface. Then the intended number of predeterminedly dimensioned balls or rolling elements 22 are placed within the retaining surface or portion 17 of ring 16; and the proportioning of the parts, including the inner diameter of surface 17, the balls 22 and wedging projection or formation 20, is such that this placement is finally accomplished only under axial force on the last ball to be placed. As the result, the annular array of balls 22 extending from opposite circumferential sides of the wedging element 20 are placed under substantial circumferential compression between the sides of the last named formation, and are also thrust radially outwardly under relatively strong force against circumferential wedging surface or portion 17. The forces are akin to those of a keystone arch structure; and the relatively thin nature of retainer 16 permits its axial retaining portion to be slightly deformed outwardly by the balls 22. Thus the latter are restrained against unassisted axial movement relative to the surface, as well as unassisted radial inward movement from said surface.

With the balls thus assembled to the retainer, such assembly is placed with its balls engaging the race surfaces 15 of worm 10, and is then approached by axial movement of the latter toward the adjacent annular surface of bearing cup 11. This may take place before or after that cup has been relatively loosely or tightly mounted within the counterbore 13 of the journaling structure 12. The flange 18 axially engages the race member 11.

Continued axial approach of worm 20 in the direction referred to causes its race surface 15 to forcefully displace the balls 22 out of their circumferentially and radially outwardly confined condition within retaining-surface 17, and into the race surface 14. Worm 10 follows, until its end is telescoped within race cup 11, with the series of balls occupying a radial plane common to the axially assembled race surfaces 14 and 15. This completes the intended assembly, whereupon retainer ring 16 drops loosely away from the balls and hangs suspended, as shown in FIG. 3, by the worm 10. Such worms are usually of a hard steel, well capable of withstanding the very slight wear of the retainer in this loose condition.

FIG. 4 of the drawings shows the geometry of the circumferential and radial forces which arise in the preliminary assembly of the balls 22 to the retainer 16, prior to final assembly of the balls from the retainer and between race surfaces 14, 15. It is seen that the axial force attending placement of the last ball of the array of balls extending from opposite sides of the wedging projection or formation 20, such array extending along an arc "A," results in forces rendering the pre-assembly self-sustaining against axial and radially inward separation of the balls from ring 16. Thus, assuming that the wedging and retaining formation 20 is desiredly designed to engage adjacent balls of the formation at an attack angle "a," the result is that circumferential compression exists between successive balls on theoretical lines "b" connecting their respective centers, which lines individually subtend portions of the circumferential arc "A" as chords of the latter. That is, the formation 20 engages the bearing elements at either side thereof at contacting portions of the rolling surfaces of the latter which are located radially inwardly of the rolling axes thereof. Consequently, individual, radially outwardly acting force components are exerted on the balls 20 along vector lines "c," which have the effect of maintaining the balls against the retainer surface 17 under force sufficient to prevent unassisted radially inward movement from the surface 17. As indicated above, these forces act to locally indent the axial retainer surface 17 ever so slightly, thus preventing unassisted axial displacement of the balls 22 from retainer 16 prior to final assembly of the bearing structure.

Structurally speaking, the retainer 16 is of very inexpensive, thin stamped metal construction, making possible its disposal, in effect, after a single use. Procedurally speaking, the operations of assembling the balls to retainer 16 and of completing the assembly of the balls from the ring to and between the race surfaces, using one race-bearing component as part of the assembly equipment, are exceedingly quickly and easily performed by inexperienced or unskilled personnel.

What I claim as my invention is:

1. A method of assembling a circumferential series of rolling bearing elements between the coaxial, circumferentially extending race surfaces of a pair of coaxial, radially spaced bearing race members, comprising disposing a substantial number of the elements of said series in a circumferentially extending array, with a pair of elements of said array in circumferentially spaced relation to one another, while rigidly confining said array against radially outward movement of the elements, and causing circumferential and outwardly acting compressive force to be exerted directly on said array in opposite directions at and from said pair of elements radially inward of the rolling axes of all of said elements, thus to retain the elements in said array against unassisted separation thereof, thereafter disposing said series of elements, as thus confined and compressed in said array, in coaxial relation to and axially between said race members, and exerting axial force in opposite directions on said race members to cause the latter to engage and simultaneously put said series out of said confined and compressed condition and substantially in a radial plane through said race surfaces.

2. A method of assembling a circumferential series of rolling bearing elements between the coaxial, circumferentially extending race surfaces of a pair of coaxial, radially spaced bearing race members, comprising disposing a major part of the elements of said series in an annularly extending array, with a pair of opposite end elements of said array in circumferentially spaced relation to one another, while rigidly confining said array against radially outward movement of the elements, and causing circumferential and outwardly acting compressive force to be exerted directly on said array in opposite directions at and from said end elements radially inward of the rolling axes of all of said elements, thus to retain the elements in said array against unassisted separation thereof, thereafter disposing said series of elements, as thus confined and compressed in said array, in coaxial relation to and axially between said race members, and exerting axial force on said series of elements in opposite directions on said race members to cause the latter to engage and simultaneously put said series out of said confined and compressed condition and in a position engaging between said race members substantially in a radial plane through said race surfaces.

3. A method of assembling a circumferential series of rolling bearing elements between the coaxial, circumferentially extending race surfaces of a pair of coaxial, radially spaced bearing race members, comprising disposing a major part of the elements of said series in an annularly extending array, with a pair of opposite end elements of said array in circumferentially spaced relation to one another, while rigidly confining said array against radially outward movement of the elements, and causing circumferential and outwardly acting compressive force to be exerted directly on said array in opposite directions at and from said end elements radially inward of the rolling axes of all of said elements, thus to retain the elements in said array against unassisted separation thereof, thereafter disposing said series of elements, as thus confined and compressed in said array, in coaxial relation to and axially between said race members, and exerting axial force to move said members relatively toward one another axially, thus to bring said race surfaces into substantial alignment in a radial plane, and in opposite directions on said race members to cause the latter to engage and simultaneously put said series out of said confined and compressed condition and in a position engaging between said race members substantially in said radial plane of the race surfaces.

4. A method of preparing for assembly of a circumferential series of rolling bearing elements between coaxial race surfaces of a pair of bearing race members, prior to said assembly relative to either race member, comprising disposing a substantial number of the elements in a circumferentially extending array, with a pair of successive elements in circumferentially spaced relation to one another, while rigidly confining said array from its exterior against radially outward movement of the elements from the array, and causing outwardly acting compressive force to be exerted directly on said successive elements in opposite directions at points radially inwardly of the rolling axes of all of said elements, thus to circumferentially and outwardly compress the array and confine and retain the elements in said array against unassisted separation therefrom.

5. A method of assembling a circumferential series of rolling bearing elements between coaxial race surfaces of a pair of bearing race members, comprising disposing the elements in an annularly extending array, with a pair of successive elements in circumferentially spaced relation to one another, while rigidly confining said array from its exterior against radially outward movement of the elements from the array, causing outwardly acting compressive force to be exerted directly on said successive elements in opposite directions at points radially inwardly of the rolling axes of all of said elements, thus to circumferentially compress the array and confine and retain the elements in said array against unassisted separation therefrom, and thereafter exerting axial force to move said race members relatively toward one another axially, with said series of elements interposed, thus to simultaneously bring said race surfaces into substantial alignment in a radial plane, and to put said series out of said confined and compressed condition and in a position engaging between said race members substantially in said radial plane of the race surfaces.

References Cited by the Examiner

UNITED STATES PATENTS

| | | | |
|---|---|---|---|
| 2,215,134 | 9/1940 | Rennberg | 29—201 X |
| 2,312,615 | 3/1943 | Allen | 308—207 X |
| 2,860,406 | 11/1958 | Reichardt | 29—201 |
| 2,931,095 | 4/1960 | Esken | 29—201 |

WHITMORE A. WILTZ, *Primary Examiner.*

THOMAS H. EAGER, *Examiner.*